Oct. 3, 1939. G. RICHTER Re. 21,227
GARMENT HANGER AND FOLDER
Original Filed April 6, 1937
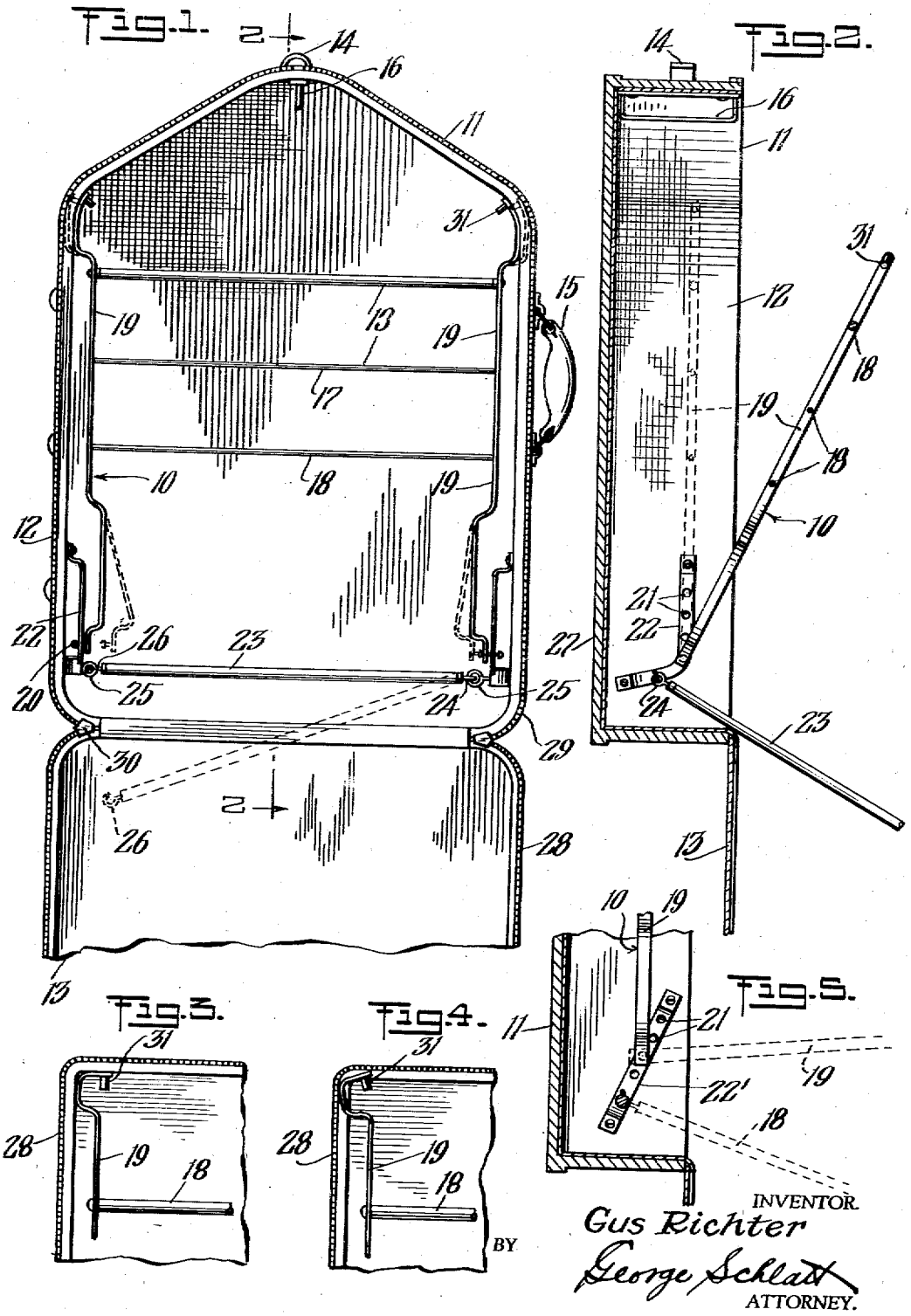

Reissued Oct. 3, 1939

Re. 21,227

UNITED STATES PATENT OFFICE 21,227

GARMENT HANGER AND FOLDER

Gus Richter, Bronx, N. Y.

Original No. 2,109,141, dated February 22, 1938, Serial No. 135,224, April 6, 1937. Application for reissue April 29, 1938, Serial No. 205,099

4 Claims. (Cl. 190—41)

This invention relates to improvements in combination garment hanger and folder.

*Objects*

Among the principal objects which the present invention has in view are: to provide a carrying device having means for retaining garments or the like in uniformly folded condition; to be enabled to hand the device and/or carry the same with garments therein; to provide removable retaining hangers when desiring to hang the device in a trunk travelling suitcase, wardrobe closet, and/or other convenient places when used for inspecting purposes; to present a compact and easily manipulated and self adjusted hanger and folder for garments, such as dresses, gowns and other articles of wear; to provide a garment folder with means whereby the same is retained snugly in the interior of the carrying device; to provide a garment folder within a carrying device for holding garments or the like whereby the garments or the like will be prevented from becoming distorted, wrinkled, unshapely or otherwise unfit to wear immediately upon removal from the folder and carrying device; to be enabled to easily and conveniently release the folder for removing and replacing garments or the like thereto; to be enabled to adjust the folder to receive garments of varying sizes; to be enabled to detach one folding member before inserting a garment therein and/or before removing a garment therefrom; to secure simplicity of construction, operation and low cost to manufacture; and to obtain other advantages and results as may be brought out in the following description.

*Drawing*

Figure 1 is a front elevation showing a carrying device in open condition and the garment folder in place therein;

Figure 2 is a vertical sectional view and showing the folder in elevation as in released position and as extending outwardly from the device;

Figures 3 and 4 are elevational views of one corner of a carrying device and showing slightly modified construction of the means for snugly holding the folder within the device and released therefrom; and Figure 5 is a modified construction of the means utilized when the folder is to be used for retaining garments of varying sizes.

*Description*

As will be seen by the drawing; the invention comprises in its general aspect, a folder device 10 which may be operatively mounted in any suitable compartment or container 11 for receiving garments and folding them into convenient space without wrinkling the garments or causing any unsightly creases therein. The invention is not limited to use of any particular garment or type of garment, it being equally applicable to use with dresses and gowns or men's, women's or children's coats, cloaks, suits or men's or boys' trousers. Likewise the invention is not limited to a particular design, style or type of container, the invention contemplating use in connection with both hand luggage and all types of heavier baggage such as Pullman cases, trunks and so forth.

In the specific embodiment of the invention illustrated, the container 11 is shown as a wardrobe suitcase having a body portion 12 to which is hinged or otherwise secured a lid 13. The mechanical details of the construction of the case need not be entered into except to say that the body portion is preferably sufficiently rigid in character to provide a compartment of definite size and to provide a support for both the folding device therein and to garments to be carried thereby. It may accordingly be of covered wood frame or box construction and may have one end sloping to a midpoint as in Figures 1 and 2 for accommodating the usual shape of coat and garment hangers, or may be rectangular in shape as indicated in Figures 3 and 4.

According to the showing in Figure 1, a suitable loop 14 is provided at the peak of the end which slopes, said loop enabling the container to be hung in the closet or elsewhere, and for convenience this end will be referred to as the upper end of the container. However, it will be appreciated that the cases may assume other positions during use, and in effect, a carrying handle 15 is shown at one side of the container so that there will be times when that side will obviously be at the top. However, for brevity and convenience the assumed position will be considered as mounted throughout the following description. At the inside of the peak of the upper end of the container is provided a hanger bar 16 securely mounted for receiving the usual hooks of conventional coat hangers (not shown) on which garments are ordinarily hung in closets or elsewhere. The length of the container from the said upper end to this lower end, is less than the usual length of a garment, and consequently when the garment is hung by a hanger suspended from hanger bar 16, the lower part of the garment will extend below the lower end of the container. The cover 13 heretofore mentioned is preferably hinged at the lower end of the container and is preferably flexible, and the suspended garments will fall against this cover and be kept from engagement with the floor or other surfaces by presence of the flexible cover should the container be either hung at the low point or actually resting upon the floor or other surfaces.

Within the container and forming part of device 10, is a removable rack 17 having cross bars 18, 18 the ends of which are carried by side rails 19, 19. The lower end parts of the side rails extend below the lowermost cross bar 18, and being resilient may be deflected toward each other as indicated in dotted lines in Figure 1 thus making laterally projecting pivot studs 20 thereon, removable from pivot holes 21 in cleats 22 fixed to the side walls of the container. The pivot studs 20, when inserted in pivot holes of the cleats will permit the rack 17 to be tilted out of the container or returned into the container. The upper ends of the side rails similarly extend above the uppermost cross bar, and are resilient and tend to spread apart, as indicated in dotted lines, to a greater width than the width of the container. These upper ends will therefore exert a resilient holding grip upon the walls of the container and will prevent the rack from tilting out of the container except when actually removed therefrom by the user. Furthermore, the cleats 22 are shown each having several pivot holes 21 enabling the rack to be adjusted as to its pivotal position and its relation to the garment.

In addition to the above mentioned rack, I preferably provide a bar 23 shown as having an eye 24 on one end permanently linked in an eye 25 projecting from one of the cleats 22, and shown as having at its other end a hook 26 engageable with an eye 25 of the other cleat. The said bar 23 may thus be extended across the container in spaced relation and parallel to the back wall 27 of the container, and will constitute a means about which the garment can be folded.

In use, the rack may be entirely removed from the container if so desired, but in most instances will probably only be swung upon its pivots to extend in a direction away from the upper end of the container, likewise the bar 23 may be unhooked and swung to one side. A garment, still retained upon its conventional coat hanger can then be hung from the hanger bar 16 extending out in front of both the rack and the cover 13. The garment will thus be in its smooth hanging condition, after which bar 23 is hooked in place in front of the garment. Then by swinging the rack 17 upwardly into place the lower part of the garment is carried upwardly with the rack folding around bar 23 and also front to one of the cross bars 18 depending somewhat upon the length of the garment. The very smoothfolding of the garment is thus attained and with the least difficulty and manipulation of the garment or the mechanical parts of the container. The above description refers only to one garment for purposes of simplicity, but it will be understood that usually numerous garments are packed in a piece of luggage, and in doing so they are all suspended up from hanger bar 16 before the lower folding bar 23 is hooked in place and before rack 17 is swung upwardly to fold in the garments. In other words, all garments are first mounted in the container and then all garments are folded at one time. The position of the folding bar 23 at the bottom part of the container is such that there is substantially as much space between it and the back wall and between it and the front of the container. The bar therefore enables the user to pack only so many garments as the thickness of which will permit them to nicely fill the container.

Before closing this description, I would point out that the cover 13 is preferably provided with separable fasteners 28 around the free edges thereof which will cooperate with similar fateners 29 at the sides and top of the container so that when the cover is swung to overlie the front opening of the container the separable fasteners may be caused to interlock by manipulation of a slide 30. The cover is thus drawn tightly closed over the opening and securely held until the sliders are manipulated to again free the cover. Furthermore, I wish to point out the fact that while the upper ends of the side rails of the rack have an arcuate bend to conform to the shape of the upper end of the container where the container has a sloping top, a configuration of the said upper ends of the rails may be made, as in Figures 3 and 4, to form a rectangular shape of container and still have resiliency in directions both laterally to the rails and longitudinally thereof to accommodate lengthwise adjustment of the rack and resilient retention thereof in place. Cleat 22 in Figs. 1 and 2 has been indicated to be of an elbow shape so as to provide a vertical portion with the pivot holes and the lateral portion for securing lower folding bar 23 in proper position. However, the pivoting and supporting mentioned may be accomplished by a diagonally positioned cleat 22' as shown in Figure 5.

Additional details of construction preferred to be included as part of the commercial structure, may be stated as utilizing a roller for any or all of the several cross bars. As exemplification of this feature, it will be noted that the upper cross bar 18 is shown as being rotatable, preferably having its end reduced and inserted through side rails and headed beyond the said side rails with sufficient play to enable the same to rotate. Similarly, the lower cross bar 23 between the cleats is likewise a rotatable structure, conveniently made as a central bar with a tubular outer member thereon. This rotatable structure of cross bars will enable the same to adjust itself more readily with respect to the garment when the garment is being folded about the said cross bars. Likewise, I have shown finger pieces 31 next the upper ends of the upwardly projecting resilient portions of the cross bars to enable the user to more readily manipulate, especially when withdrawing the folding and holding device from the frictionally engaged device within the container.

In using the device, the rack 17 is swung downward to rest on the bottom of the body portion 12 and the bar 23 released. The dresses are then hung by means of a coat or dress hanger of any suitable construction from the hanger bar 16. The dresses hang in natural folds from the hanger downward and along the rack 17. The bar 23 is then placed over the dresses and attached in position by means of the hook 26. The adjustment of the rack 17 in the openings 21 should be such that the bar 23 engages the dress at the waistline. The rack then is raised, thus raising the lower parts of the dresses holding the waist portion beneath the bar 23 and the rack is secured in position in the container when the container may be closed. The lower rods 18 assist in holding the dresses in position during the raising of the rack. From this description, it will be seen that the natural folds of the dress are not disturbed, as it is not necessary to tuck the dress in between parts of the device.

I claim:

1. A garment folder and hanger device comprising in combination with a container having two opposed walls, a pair of side rails spaced apart a less distance than the inside dimension of the container between said two opposed walls of the container, a plurality of fixed cross-bars extending transversely of said rails for retaining the rails in spaced relation, opposed cleats on said opposed walls, said cleats having each a plurality of pivot holes, and each side rail having one end thereof flexible and provided with a pivot stud directed toward the cleat to be removably mounted in any one of said pivot holes for pivotal support thereof and adjustable mounting of the said device, the opposite ends of said rails having resilient portions normally spreading to resiliently engage said walls for retaining the device within the container.

2. A garment folder and hanger device comprising in combination with a container having two opposed walls, a pair of side rails spaced apart a less distance than the inside dimension of the container between said two opposed walls of the container, a plurality of fixed cross-bars extending transversely of said rails for retaining the rails in spaced relation, opposed cleats on said opposed walls, means for pivotally mounting the side rails at one end of each upon said cleats, the opposite ends of said rails having resilient portions normally spreading to resiliently engage said walls for retaining the device within the container, and a cross bar about which garments may be folded, said bar having means for attaching its opposite ends to the opposed cleats.

3. A garment folder and hanger device comprising in combination with a container having two opposed walls, a pair of side rails spaced apart a less distance than the inside dimension of the container between said two opposed walls of the container, a plurality of fixed cross-bars extending transversely of said rails for retaining the rails in spaced relation, opposed cleats on said opposed walls, means for pivotally mounting the side rails at one end of each upon said cleats, the opposite ends of said rails having resilient portions normally spreading to resiliently engage said walls for retaining the device within the container, and a cross bar about which garments may be folded, said bar having means for attaching its opposite ends to the opposed cleats, one end of said cross bar being releasable from its cleat.

4. A garment folder and hanger device comprising in combination with a container having two opposed walls, means for securing a garment to the upper part of said container a pair of side rails spaced apart a less distance than the inside dimensions of the container between said two opposed walls, a plurality of fixed cross members extending transversely of said rails for retaining the rails in spaced relation, and about which the lower portion of the garment is adapted to be loosely hung, means for pivotally supporting said rails at their lower end from said side walls, said rails being adapted to swing about said pivot outwardly of said container, means for removably holding the upper ends of said side rails in said container, a cross-bar, about which garments may be folded, releasably secured to said container adjacent the lower ends of said rails, said bar being located below the pivotal axis of said rails whereby when said rails are raised the garment is lifted into snug contact with said cross bar and means for adjusting the distance apart of said cross members and bar with respect to each other.

GUS RICHTER.